US006995868B2

(12) United States Patent
Quintana et al.

(10) Patent No.: US 6,995,868 B2
(45) Date of Patent: *Feb. 7, 2006

(54) HALFTONING ALGORITHM ADAPTED TO PREVENT UNAESTHETIC OUTPUT

(75) Inventors: Jason Quintana, Brush Prairie, WA (US); Morgan T. Schramm, Portland, OR (US); Je-Ho Lee, West Lafayette, IN (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 969 days.

(21) Appl. No.: 09/895,967

(22) Filed: Jun. 29, 2001

(65) Prior Publication Data

US 2003/0011823 A1    Jan. 16, 2003

(51) Int. Cl.
 *H04N 1/52* (2006.01)
 *H04N 1/58* (2006.01)
(52) U.S. Cl. .................. 358/1.9; 358/3.04; 358/3.05; 358/3.26; 358/534
(58) Field of Classification Search ............. 358/1.9, 358/3.03–3.06, 534–536, 326
See application file for complete search history.

(56) References Cited

U.S. PATENT DOCUMENTS

| 5,140,432 A | * | 8/1992 | Chan .................. 358/3.03 |
| 6,501,564 B1 | * | 12/2002 | Schramm et al. ........... 358/1.9 |
| 6,813,043 B1 | * | 11/2004 | Mizuyama et al. ........ 358/3.03 |
| 6,870,644 B2 | * | 3/2005 | Schramm et al. .......... 358/3.05 |
| 2003/0090728 A1 | * | 5/2003 | Schramm et al. .......... 358/3.04 |

FOREIGN PATENT DOCUMENTS

| EP | 0501023 A2 | | 9/1992 |
| EP | 0507356 A2 | | 10/1992 |
| EP | 0732843 A2 | | 9/1996 |
| EP | 0887998 A2 | | 12/1998 |
| GB | 23523353 A | | 1/2001 |
| JP | 01075246 A | * | 3/1989 |
| JP | 2000354172 A | * | 12/2000 |
| WO | WO/89/06080 | | 6/1989 |

* cited by examiner

*Primary Examiner*—Scott A. Rogers

(57) ABSTRACT

A halftoning method and apparatus reduces the occurrence of unaesthetic color print output associated with the different relationships found in the numeric data contained within the color data planes. The calculation, modification and distribution of error values, resulting from the mismatch between color plane values and firing thresholds, are performed in a manner that minimizes unaesthetic conditions. Error values are modified by use of error modification functions, bitmaps and matrixes. Firing decisions are based on a comparison of the modified error.

25 Claims, 7 Drawing Sheets

|  |  |  |  |  |  |
|---|---|---|---|---|---|
| 50 | 100 | 20 | 200 | 75 | 10 |
| 20 | 200 | 75 | 10 | 160 | 80 |
| 75 | 10 | 160 | 80 | 40 | 210 |
| 160 | 80 | 40 | 210 | 150 | 50 |
| 40 | 210 | 150 | 50 | 20 | 180 |

HALFTONING ALGORITHM ADAPTED TO PREVENT UNAESTHETIC OUTPUT

TECHNICAL FIELD

A halftoning algorithm is adapted to provide more aesthetic color print output. In particular, the halftoning algorithm reduces the occurrence of repetitive patterns within a print region that may result, wherein the magnitude of the values of the color planes halftoned are unbalanced, balanced or result in overlapping color output from two planes.

BACKGROUND

In the field of color printing, primary colors are used together in a manner that results in intermediate colors. For example, an ink jet mechanism may have cyan, magenta, yellow and black print heads. In response, a digital file format associated with a color document may have data related to three color planes, i.e. cyan, magenta and yellow. By using these three planes, additional colors may be produced. For example, two or more color planes may be halftoned together to result in a region of print having a desired color. In particular, cyan and magenta are frequently halftoned to result in a spectrum of colors between these primary colors.

The color planes in the digital file format may, for example, result in an unbalanced output dot pattern that is approximately 80% to 20% each of cyan and magenta dots. Alternatively, the color planes may result in a balanced dot pattern, such as 55% cyan and 45% magenta. In both of these cases, i.e. unbalanced and balanced outputs, it is not necessary for the output to total 100%. Where the planes total less than 100%, some of the white of the paper will show through, resulting in a softer, pastel-like, shade.

Within certain regions of the document, the sum of the color planes may exceed 100%, thereby resulting in pixel locations wherein two or more colors of ink are applied. For example, in those locations within a document wherein the sum of the dot patterns of the cyan and magenta planes is over 100%, cyan and magenta dots will be applied on top of each other at a given pixel location, resulting in blue output. In this case, the color planes may be viewed as overlapping.

Within regions wherein the dot patterns from the cyan and magenta planes are unbalanced, the print output may have the appearance, particularly at close range, of short chains or lines of the minority dot color within a background comprising the majority color. Similarly, within regions wherein the dot patterns from the cyan and magenta planes are balanced, the print output may have the appearance, particularly at close range, of vertical stripes that alternate between cyan and magenta. And still further, within regions wherein the dot patterns from the cyan and magenta planes are overlapping, the print output may have the appearance, particularly at close range, of non-homogeneously distributed blue dots within regions of color derived from combination of the cyan and magenta color planes. All three of these conditions tend to catch the human eye, and suggest poor print quality.

FIG. 1, prior art, shows an enlarged view of the dot pattern of a conventional halftoning algorithm. A printed document 100 includes a plurality of regions 102 wherein a single color is intended. A first enlarged view 104 illustrates the output of unbalanced cyan and magenta color planes. Individual pixels 106 represent locations onto which dots of ink may be printed, where pixels designated with a "c" represent cyan and pixels designated with an "m," represent magenta. These pixels are organized into a pattern having minority cyan pixels grouped or bunched together within a larger region of the majority magenta pixels. This output will not have an aesthetic appearance, and in particular will be spotted and non-homogeneous.

Similarly, a second enlarged view 108 illustrates the output of balanced color planes. In this case, the cyan and magenta pixels are organized in vertical stripes, horizontal stripes, checkerboards or some combination of these. Such grouping is generally unaesthetic, and suggests some failure of the print mechanism. Additionally, in a third enlarged view 110, blue pixels (represented by "b") distributed unattractively in groups within a background of cyan.

The problems seen in FIG. 1 frequently result in the translation of digital file formats. For example, an 8-bit RGB (red green blue) file format is adapted for display on a cathode ray tube (or similar) video display monitor. To print such a file, it must be translated from RGB to a 1-bit CMYK (cyan magenta yellow black) file format. The known methods of translation can result in the flaws seen in FIG. 1, prior art.

SUMMARY

A system, method and apparatus for producing aesthetic color print output utilize error modification and base color plane firing decisions on a comparison of error values and modified error values.

BRIEF DESCRIPTION OF THE DRAWINGS

The same numbers are used throughout the drawings to reference like features and components.

DETAILED DESCRIPTION

A halftoning method and apparatus reduces the occurrence of unaesthetic color print output associated with particularly relationships found between the numeric data contained within the color data planes. The calculation, modification and distribution of error values, resulting from the mismatch between color plane values and firing thresholds, are performed in a manner that minimizes unaesthetic color print output. Error is modified by use of error modification functions, bitmaps and matrixes. Firing decisions are based on a comparison of the modified error associated with a given pixel location on two color planes.

Figure 1:
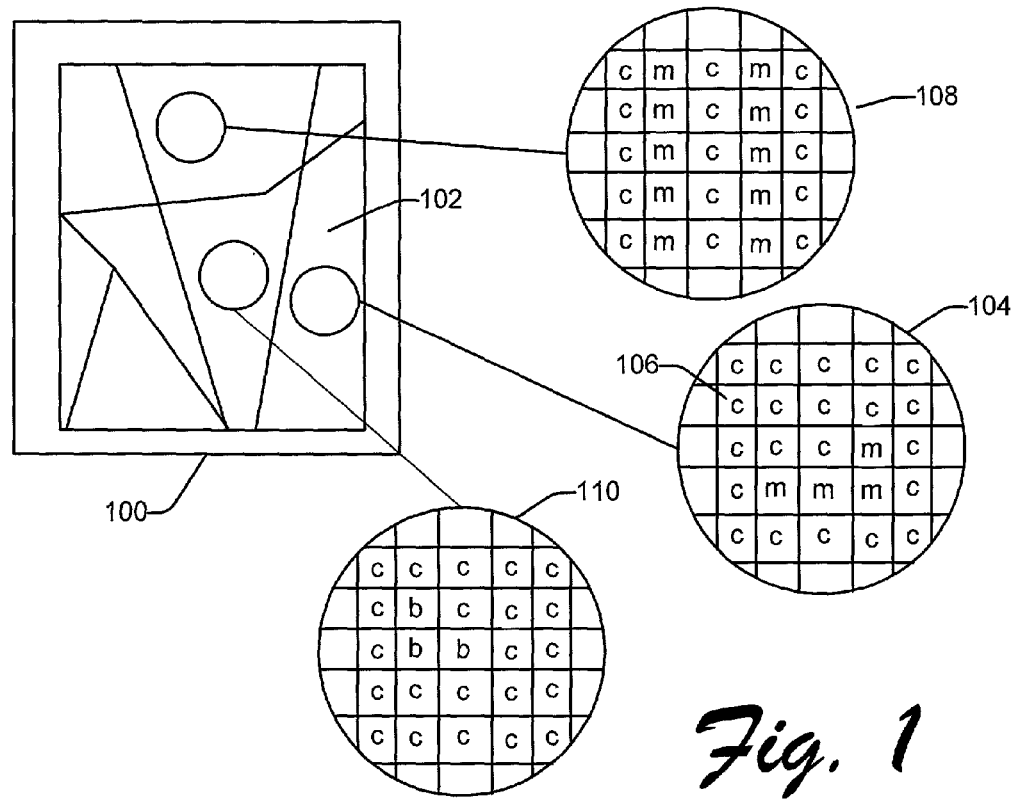
FIG. 1, prior art, is an illustration of a document having a number of differently color regions. Detail at the pixel level shows the result of color plane data relationships wherein the associated numerical values can be considered to be unbalanced, balanced and overlapping.
Figure 2:
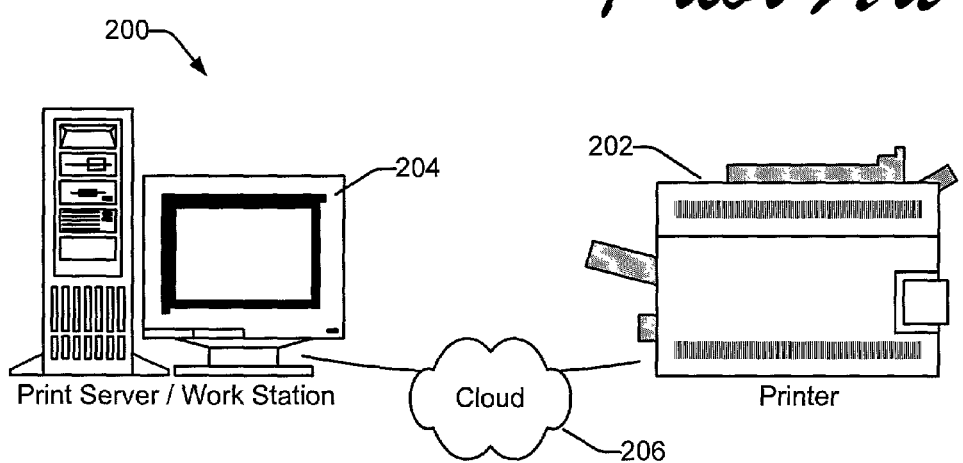
FIG. 2 is an illustration of an exemplary printing environment.

FIG. 2 shows a print system 200, having a printer 202, or similar output device such as a facsimile machine, connected to a print server 204, workstation or similar computing device. The printer may have color print capability based on ink jet, laser/toner or other technology. The printer is adapted for use with ink cartridges or alternate technology having two or more colors, such as cyan, magenta, yellow and black. The connection between the printer and print server may be made by network 206, cable or over the Internet, as required to support any desired application.

Although the print system and method for preventing repetitive patterns associated with unaesthetic output resulting from color document translation and halftoning is described in a context wherein most of the computational steps are performed on a printer, many of the tasks could alternatively be performed on the print server or other computing device in communication with the printer. Where the computational steps are performed on the printer, the printer may be equipped with computer- and/or controller-readable media having computer- and/or controller-readable instructions. Alternatively, a computationally equivalent hardware-based solution may be substituted, using an application specific integrated circuit (ASIC) or similar technology. Execution of such software-, firmware- or hardware-based instructions supports the method for color document translation, as shown and described.

Figure 3:
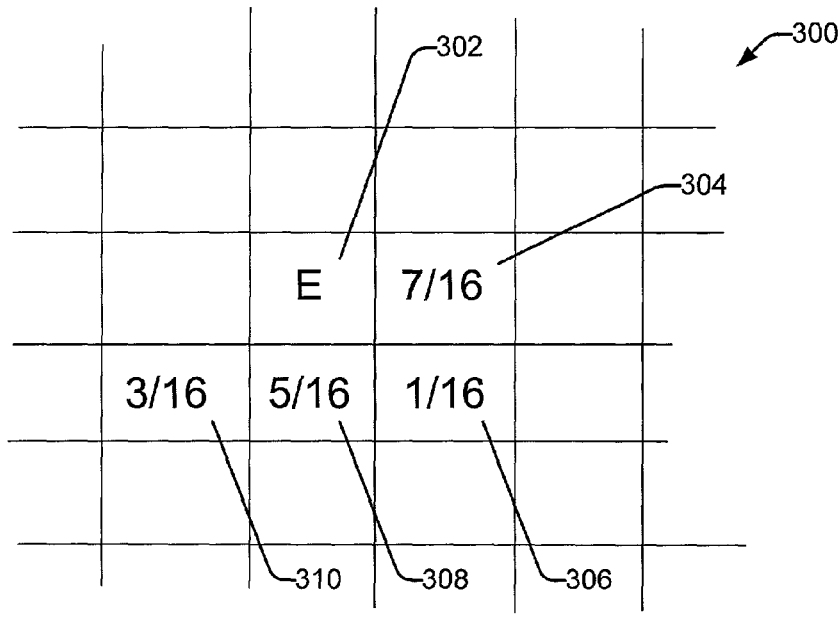
FIG. 3 is a diagram illustrating error distribution associated with a color plane.

FIG. 3 shows a weight format 300 applied to one color plane of an 8-bit CMYK file and illustrates the concepts of "error" and "error distribution." In the course of halftoning, an 8-bit value associated with each pixel in each color plane is translated to a 1-bit value in a plane of the same color in the 1-bit CMYK output file. During the process by which two color planes are halftoned, the numeric value associated with a given pixel in a given color plane may not result in an exact threshold value required for firing. Accordingly, "error" results from the numeric value of the color plane when less than the threshold, or the amount by which the threshold is exceeded.

Error and error distribution are related to the need to smooth a continuous (i.e. 0 to 255) color tone into a quantized (0 or 1) output. Error is related to the absolute difference between the color plane values and the firing threshold. Error distribution is a method by which this difference is distributed to adjacent pixel locations on a given color plane following a firing decision.

The operation of error calculation and distribution may be understood by reference to an example embodiment of the halftoning algorithm adapted to prevent repetitive patterns associated with unaesthetic output. If the color value of cyan with respect to a given pixel in a given color plane of a given 8-bit CMYK file is 150 and the value of a variable associated with the cyan error with respect to that pixel is 50, the sum of these values is 200. If the firing threshold is 255, then the sum is too small to result in a value of "one," rather than "zero," being entered into the 1-bit cyan color plane of the CMYK output file. Thus, the cyan ink jet will not "fire" at this pixel location. However, after the firing decision, the entire value of 200 will be considered to be "error," and will be distributed, in a manner seen below, to other adjacent pixels. This distribution makes the pixels receiving the distribution of "error" more likely to exceed the firing threshold. In a second example, if the color value for an adjacent pixel is 200, and the error is 100, the resulting total will be 300. A decision to fire is made (i.e. a value of "one" is entered into that pixel location of the cyan color plane of the 1-bit CMYK output file). Due to the "firing," 255 is subtracted from the 300 and an error value of 45 is distributed forward to adjacent pixels.

Exemplary distribution of error from one location to four locations is seen in FIG. 3. This example shows how "weights" may be used within the context of "error distribution." The value of the error at pixel 502 is represented by the term "E," and is associated with a single pixel location 302. This value is arrived at after the firing decision is made, and after the possible subtraction of a bit depth quantity. Generally, the bit depth quantity is 255, because the input file has 8-bit color and the output file has 1-bit color. However, if the input file had 16-bit color and the output file was 1-bit color, the bit depth quantity would be 65,535. The number of pixels to which the error is distributed is somewhat variable; however, in FIG. 3, four pixels are shown receiving error. Pixels 304, 306, 308 and 310 are considered to be forward, forward-and-down, down, and down-and-back with respect to pixel 302. Note that error is always distributed to pixels that have not yet been processed.

The fractional values governing the percentage of error transferred to each pixel are considered to be "weights." The fractions assigned to each weight are variable; however in FIG. 3 weights of 7/16, 1/16, 5/16 and 3/16 are associated with pixels 304 through 310, respectively. These values may total 100%, or may be a different value. Also, the weight format used by one color plane does not necessarily have to be used by a different color plane. Thus, after the firing decision is made, possibly resulting in subtraction of 255 or other bit depth quantity from the value in pixel 302, the remainder is used to increment variables containing the error totals associated with pixels 304 through 310 according to the weights used.

For example, where the value of the cyan color plane within a given pixel location is 200, and the value of a variable cyan_error associated with that pixel and color plane is 215, the total value is 415. This is greater than 255, and so a positive firing decision is made. Due to the firing decision, 255 is subtracted from the 415, leaving 160. The error is therefore 160, and is distributed to the four neighboring pixels, as seen in FIG. 3. For example, the forward pixel receives 7/16 of the 160 error, or 70. Thus, a variable cyan_error associated with that pixel location is incremented by 70. The variables cyan_error associated with three other pixels are also incremented according to their weights. Note, however, that in blocks 608 and 906 of FIGS. 6 and 9, respectively, that the firing decision is based on modified error alone, i.e. without the color plane value. Thus, the above discussion is directed to one example of error distribution, and care must be taken in many applications to segregate the color plane values from the error values.

As a result of the error distribution, every pixel location on every color plane includes the color plane value, as well as an error value. As will be seen in greater detail below, in some cases, the sum of these values will be required. In other cases, the error value will be required, such as when an error value is modified, as by the table of FIG. 7.

Figure 4:
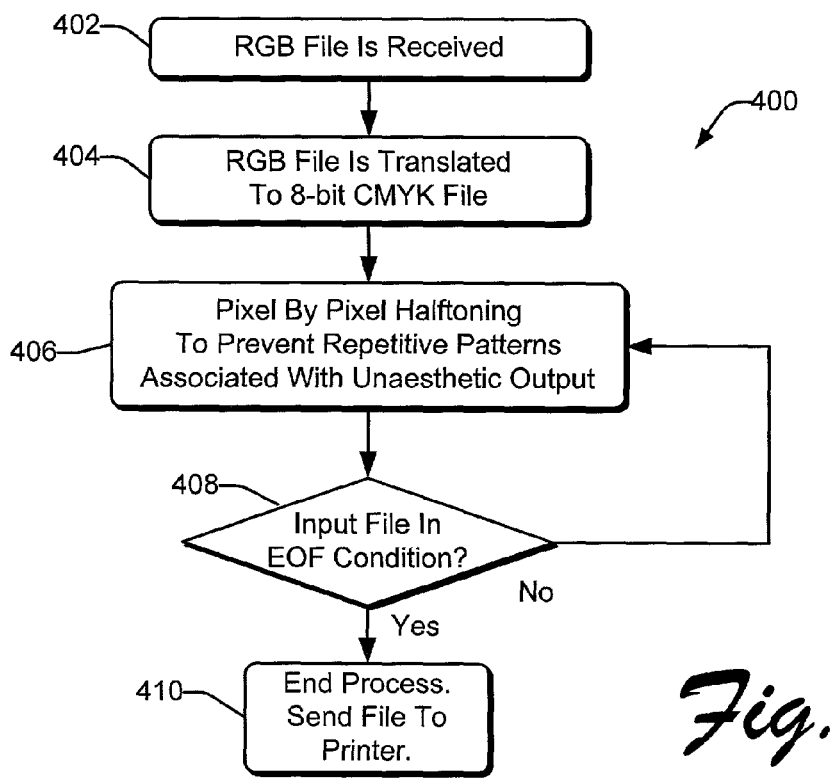
FIG. 4 is a flow diagram illustrating a method and the operative format of an apparatus to prevent repetitive patterns resulting in unaesthetic color print output.

FIG. 4 shows a method 400 by which a halftoning process converts an input color document having 8-bit values contained within each pixel location in each color plane into an output color document having 1-bit values within each pixel location in each color plane. The resulting 1-bit data in the color planes are firing decisions, which cause a printhead or nozzle associated with a given ink color to fire or not fire on a given pixel location. The 8-bit color plane data of the pixel are halftoned into 1-bit color plane data by an algorithm that prevents the problems associated with unbalanced, balanced and overlapping conditions, thereby preventing unaesthetic color print output.

At block 402, an 8-bit RBG (red, green, blue) file is received. The RGB file is suitable for display by an additive color display device, such as a CRT (cathode ray tube) or similar type computer video display. Such a file has a color plane associated with each color, each pixel of which is represented by an 8-bit binary number.

At block 404, conventional translation technology is used to translate the RGB file to an 8-bit CMYK (cyan, magenta, yellow, black) file. The CMYK file is suitable for use by a printer having a subtractive color environment, wherein three or four colors of ink reflect the wavelength of light with which they are associated, and absorb other frequencies. The CMYK file has a color plane associated with each color, each pixel of which is represented by an 8-bit binary number.

At block 406, the data from each color plane associated with a given pixel location are halftoned together in a pixel-by-pixel manner. This halftoning process is shown in detail in FIG. 5, as will be seen.

At block 408, the input file is examined to determine if the last pixel has been evaluated. Where an end of file (EOF) condition for the input file is not true, data associated the next pixel in sequence is investigated at block 406. The next pixel is typically selected in a serpentine manner, wherein each row of pixels is processed in the reverse order of the row immediately preceding it.

At block 410, where an eof condition existed at block 408, the output file is sent to the print device based on ink jet, color laser print engine or other technology. In one implementation, the output file is in a 1-bit CMYK format, having three or four color planes, each plane having one bit associated with a firing decision for each pixel. In the example of the ink jet technology, the one bit tells the ink jet associated with the same color plane to fire or not fire, as appropriate, in each pixel location.

Figure 5:
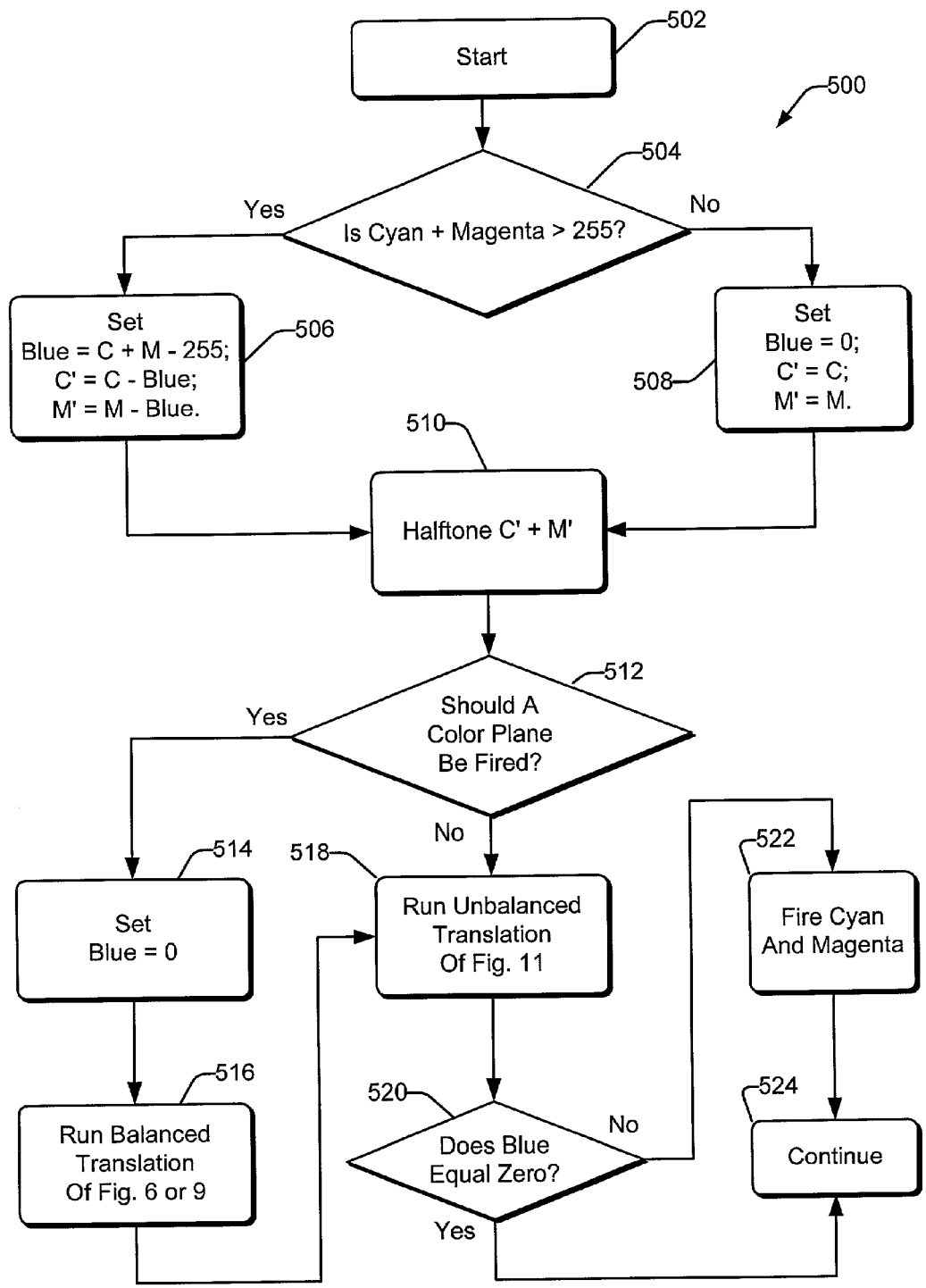
FIG. 5 is a flow diagram illustrating block 406 of FIG. 4 in greater detail.

FIG. 5 shows an exemplary method 500 by which one pixel location within two color planes may be halftoned together in a manner that prevents repetitive patterns associated with unaesthetic output. The entire method 500, beginning at block 502 and ending at block 524, includes detail not seen in block 406 of FIG. 4.

Blocks 504 through 510 evaluate the sum of the values of one pixel location within two color planes, such as cyan and magenta. The values to which variables Blue, C prime and M prime are set depend on the relative size of the sum and the bit depth quantity. C' and M' are then halftoned together. Block 512 determines if a color plane should be fired. Where a plane should be fired, at blocks 514 and 516, the variable Blue is set to zero to prevent both planes from firing, and the error is modified to prevent unaesthetic print output associated with balanced color plane data. The firing decision is made based on the relative magnitudes of the modified error. At block 518, variables are decremented to reflect firing, and error is distributed to prevent unaesthetic print output due to unbalanced color plane data. At blocks 520 and 522, where an overlapping condition exists, cyan and magenta are both fired to result in a blue pixel.

At block 504, the magnitude of the sum of the color values of cyan and magenta for a particular pixel location is compared to 255, or other bit depth quantity. The cyan and magenta values are found within the 8-bit storage locations in the color planes associated with the pixel of interest. The error values associated with the color plane locations, i.e. cyan_error and magenta_error, are not used in the comparison. Where the sum of cyan and magenta exceeds 255 or other bit depth quantity, block 506 is executed; otherwise block 508 is executed.

At block 506, where c+m exceeded 255, variables are defined for blue, C' and M'. Blue is the color resulting from firing of both the cyan and magenta color planes on one pixel. C' and M' represent variable values associated with cyan and magenta. Blue, C' and M' are derived according to the following pseudo code.

```
if(c+m>255)
    //blue assigned magnitude by which sum exceeds 255
    blue=c+m−255;
    //subtract the magnitude of blue from cyan and magenta
    //and rename c' and m'
    c'=c-blue;
    m'=m-blue.
```

At block 508, where c+m was less 255, blue is set to zero, and C' and M' are set to the existing values of cyan and magenta, respectively.

At block 510, the cyan_error and magenta_error are calculated. Cyan_error is equal to cyan prime (C') color value plus the value of the cyan error distributed from adjacent pixels. Similarly, Magenta_error is equal to magenta prime (M') color value plus the value of the magenta error distributed from adjacent pixels. The sum of Cyan_error and Magenta_error is compared to 255 or other firing threshold.

At block 512, the halftoning of block 510 is reviewed to determine if a "firing" should result. If there was a firing, then control is sent to block 514 and 516, to determine which color plane is to fire; otherwise, control is sent to block 518.

At block 514, a variable designated as blue is set to zero, indicating that the cyan and magenta planes will not both fire, and as a result, a blue pixel will not be created.

Figure 6:
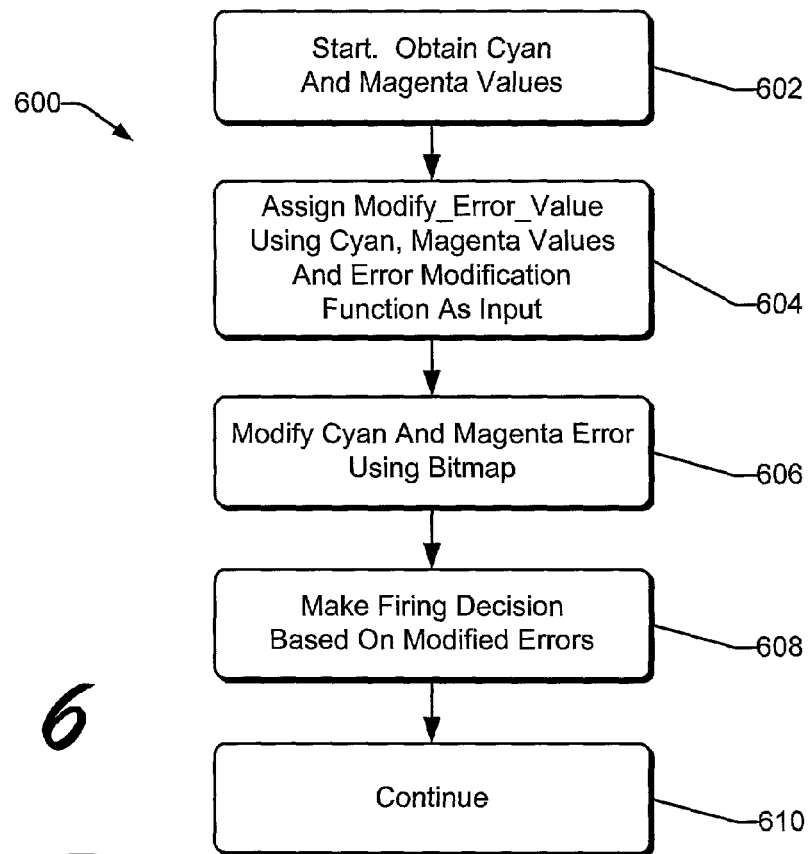
FIG. 6 is a flow diagram illustrating block 516 of FIG. 5 in greater detail.
Figures 8, 9:
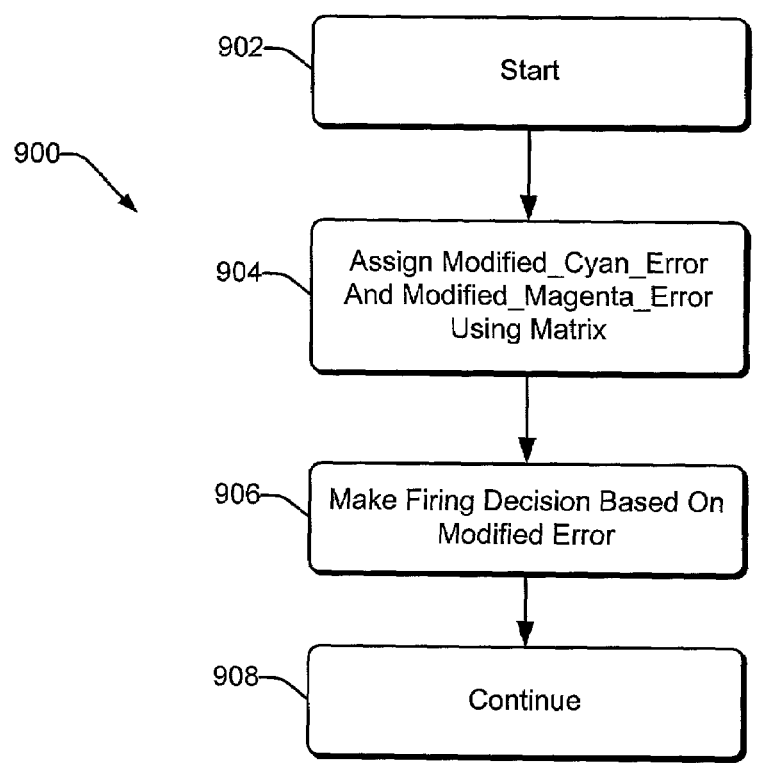
FIG. 8 is a diagram illustrating an exemplary bit map associated with the flow diagram of FIG. 6.
FIG. 9 is a flow diagram illustrating a block of FIG. 5 in greater detail.

At block 516, either the algorithm of FIG. 6 or the algorithm of FIG. 9 is run. These algorithms address the issue of unaesthetic print output caused by color planes having values of balanced magnitude within a region. Both algorithms modify the cyan_error and magenta_error variables associated with the current pixel. A firing decision is then made based on the relative magnitude of the modified error values, rather than the color plane values.

Figure 11:
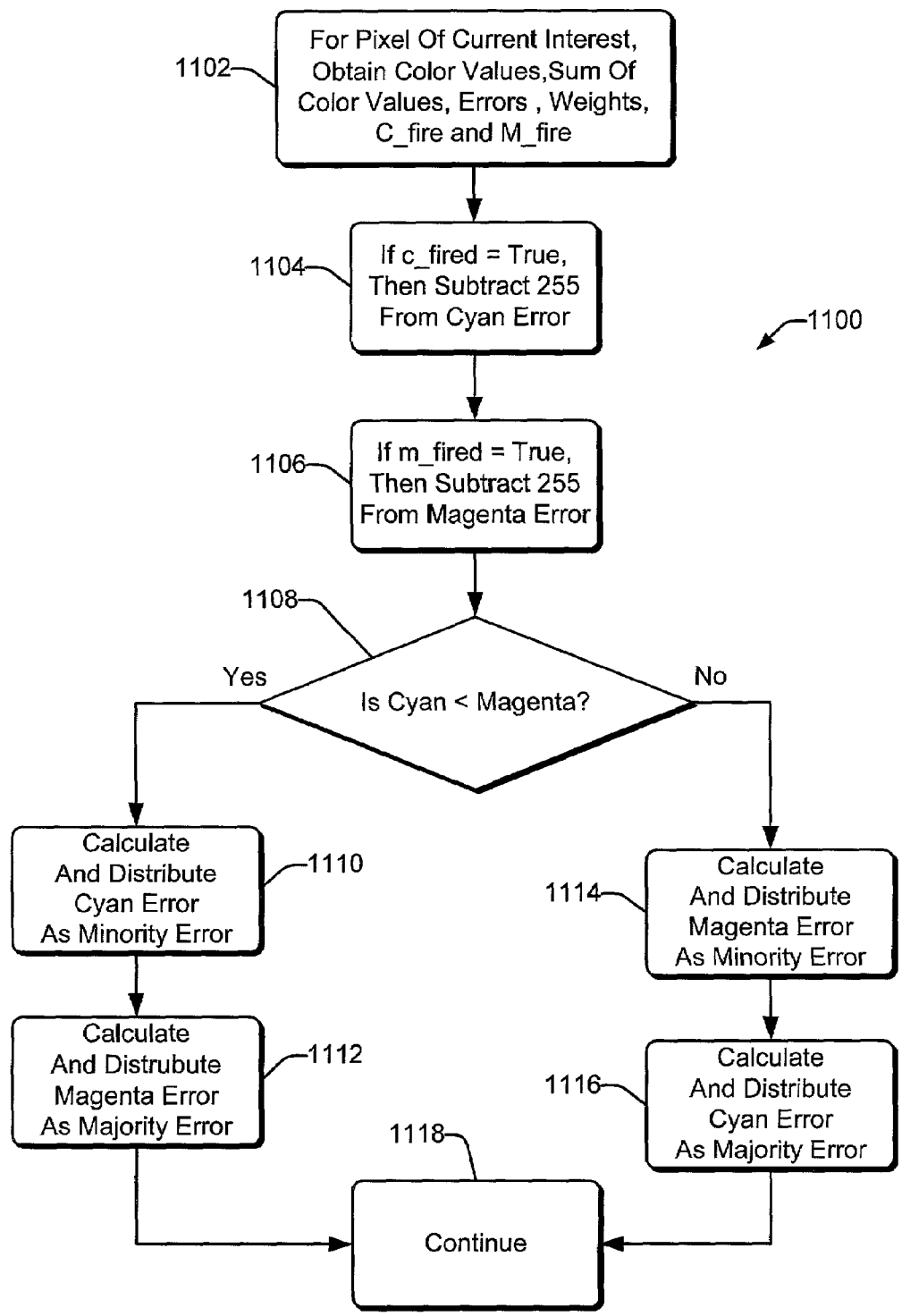
FIG. 11 is a flow diagram illustrating block 518 of FIG. 5 in greater detail.

At block 518, the algorithm of FIG. 11 is run. This algorithm checks to see if one of the color planes was fired. The error is then modified and distributed, as will be seen. The algorithm of FIG. 11 is associated with the need to reduce aesthetic problems associated with color planes having unbalanced numeric values.

At block 520, blue is compared to zero. If blue is zero, control moves to block 524; otherwise, control moves to block 522.

At block 522, because blue is not zero, both the cyan and magenta planes should be fired. Accordingly, a one is put into the appropriate pixel location in both color planes of the output file.

At block 524, control is returned to block 408 of FIG. 4, where the end of file condition is checked.

FIG. 6 shows an exemplary method 600 that corrects unaesthetic print output associated with color plane data that is in an overly balanced condition. That is, color plane data within a region of the color planes where the numeric values are balanced enough to result in unaesthetic print output having vertical stripes, horizontal stripes, checkerboard or combination of these. The method 600 illustrates detail not seen in block 516 of FIG. 5, by which a firing decision is made based on modified errors, and particularly where the errors have been modified by use of an error modification function and a bitmap.

At block 602, control is transferred from block 516 of FIG. 5. The cyan and magenta color values, or cyan prime (C') or magenta prime (M') for a given pixel are obtained from the color planes of the input file. Where the input file is CMYK file having 8-bit color planes, the color values will be in the range of 0 to 255.

Figure 7:
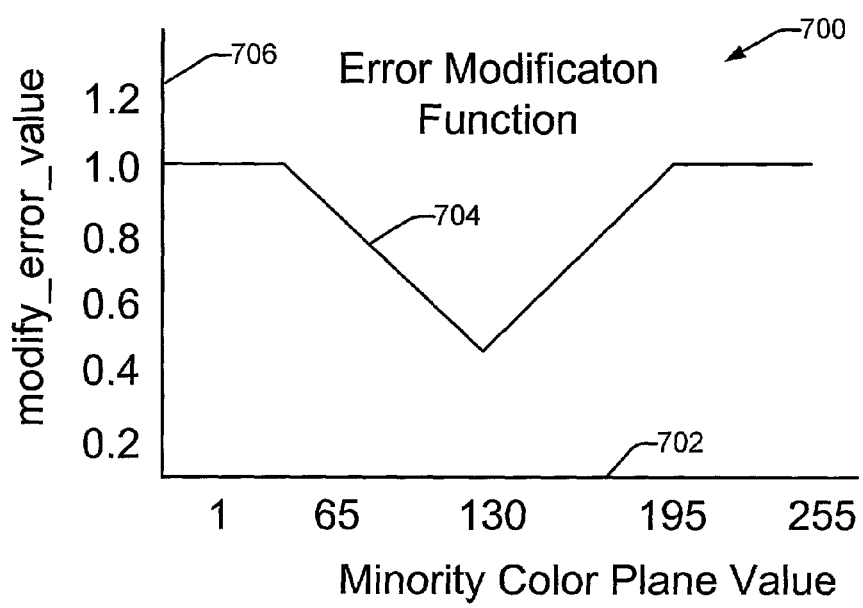
FIG. 7 is a diagram illustrating a function for use in modifying error.

At block 604, an error modification function is used to obtain an error modification fraction, modify_error_value for later use. FIG. 7 illustrates a chart depicting one implementation of the error modification function 700. The horizontal axis 702 is associated with the value of the color plane, in the location of the pixel of current interest, having the smallest magnitude. The error modification function 704 is seen graphed within the chart. The vertical axis 706 contains fractional values by which the error associated with one of the color planes will be multiplied.

In operation, the cyan and magenta color values, or C' and M', i.e. the 8-bit values in the color planes associated with the current pixel, are evaluated to determine the smaller. The magnitude of the smaller color value is compared with the horizontal axis of an error modification function, such as that seen in FIG. 7. By moving upward from the correct location on the horizontal axis, the graphed function is encountered. By moving to the left, a decimal value is encountered. This value is assigned to the variable modify_error_value. For example, suppose that the cyan value, found in the appropriate pixel location of the cyan color plane of the input file, is 115, and that the associated magenta value, found similarly, is 167. By comparison, it can be seen that the cyan value is the smaller. Applying the cyan value to the horizontal axis of the conversion function, an associated error modification value can be found on the vertical axis. Here, the cyan value of 115 is associated with a modify_error_ value of approximately 0.60.

At block 606, a bit map is used to modify the cyan_error and the magenta_error. As was seen in the discussion of FIG. 3, in addition to a color value found on the color plane, each color associated with each pixel has an associated error. The error is accumulated in a variable, such as cyan_error and magenta_error, associated with each pixel. At block 606, this error is modified, thereby creating cyan_error_ modified and magenta_error_modified. The modification is made after reference to a bitmap, such as the bit map of FIG. 8.

FIG. 8 shows an exemplary bitmap having ones and zeros distributed across a two-dimensional grid having dimensions consistent with the number and arrangement of the pixels present in the input CMYK or similar file. Alternatively, the bitmap can be assembled from smaller grids, and then extended in a tiled manner. The distribution of ones and zeros, together with the algorithm of block 606, assists in the prevention of the appearance of repetitive patterns. While an almost infinite number of different bitmaps are possible, it is generally true that vertical and horizontal runs of either ones or zeros are to be avoided, as these runs may encourage, rather than discourage, the appearance or repetitive patterns. Accordingly, the bit map of FIG. 8 limits horizontal and vertical runs of both 1's and 0's to no more than several pixels.

The below fragment of pseudo code illustrates how the cyan_error_modified and magenta_error_modified values are determined according to the bitmap.

```
if(bitmap==1)
    //if in bitmap, encourage magenta by reducing cyan error
    cyan_error_modified=modify_error_value*cyan error;
    magenta_error_modified=magenta_error;
else
    //if out of bitmap, encourage cyan by reducing magenta error
    magenta_error_modified=modify_error_value*magenta_error;
    cyan_error_modified=cyan_error.
```

The determination of bitmap=1 is resolved by looking at the location in the bitmap associated with the pixel being processed. Arbitrarily, where the bitmap is one in that pixel location, the cyan error is reduced by the modify_error_value derived from block 604. As seen in the above example, wherein the cyan value of 115 was associated with a modify_error_value of approximately 0.60, the cyan_error_modified will be set at to 60% of the original cyan error value. In contrast, magenta is maintained; i.e. magenta_error_modified is set equal to magenta_error. If the bitmap has a zero, then the magenta error is reduced by the modify_error_value, and the magnitude of the cyan error is maintained. Accordingly, the bitmap of FIG. 8, when applied to the values of error associated with colors of two or more color planes, tends to decrease the modified error of all but one color.

At block 608, the firing decision is based on determination of the greater of the magenta_error_modified and the cyan_error_modified. The below fragment of pseudo code illustrates the process.

```
if(magenta_error_modified>cyan_error_modified)
    magenta_fired=1;
    cyan_fired=0;
else
    cyan_fired=1;
    magenta_fired=0.
```

The firing decision results in one's and zero's being placed in the appropriate locations of the appropriate color planes.

At block 610, control is returned to block 518 of FIG. 5.

FIG. 9 shows an exemplary method 900 that is an alternative to the method 600 of FIG. 6. FIG. 9 shows an exemplary method 900 that corrects unaesthetic print output associated with color plane data that is in an overly balanced condition. The method 600 illustrates detail not seen in block 516 of FIG. 5, by which a firing decision is made based on modified errors, and particularly where the errors have been modified by use of a matrix having numeric values from 0 to 255.

At block 902, control is received from block 516 of FIG. 5.

Figures 10, 12:
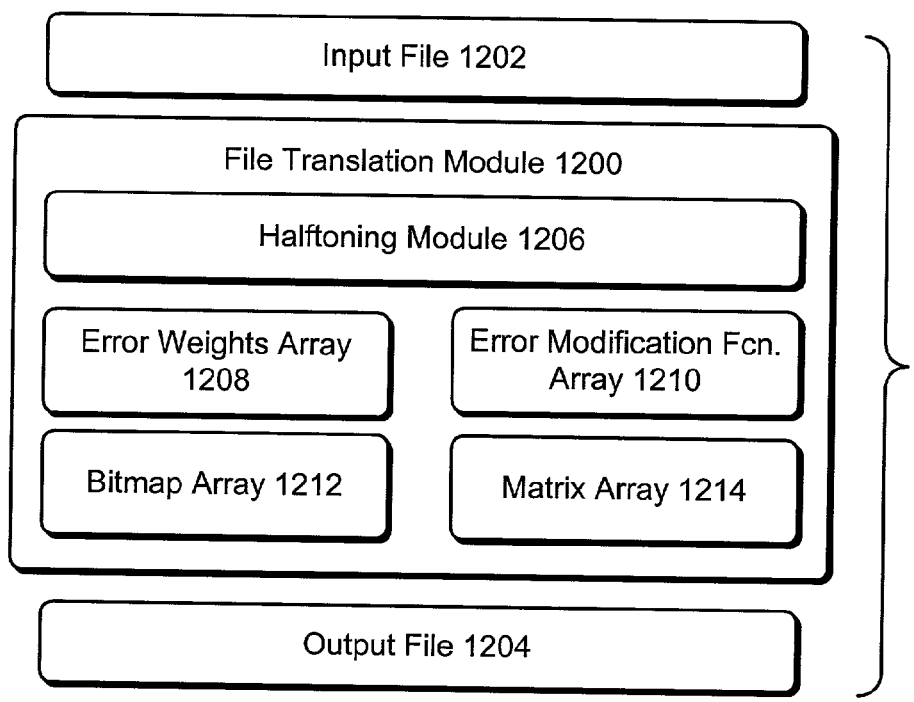
FIG. 10 is a diagram illustrating an exemplary matrix associated with the flow diagram of FIG. 9.
FIG. 12 is a block diagram illustrating the relationship between exemplary software and data file structures associated with the method and apparatus to prevent repetitive patterns associated with unaesthetic output.

At block 904, modified cyan and magenta errors are assigned using the matrix of FIG. 10. For example, a matrix can be used to find values of c_error_modified and m_error_modified using cyan prime (C') and magenta (M'). The following pseudo code illustrates the process.

```
if(C'>matrix[i,j])
    c_error_modified=(matrix_value/256)*cyan_error;
if(M'>255-matrix[i,j])
    m_error_modified=(matrix_value/256)*mageneta_error.
```

Accordingly, cyan prime (C') is compared to the matrix value for the application location and magenta prime (M') is compared to the inverse matrix value, i.e. the value of the location of the matrix subtracted from 255 or other bit depth quantity. A portion of an exemplary matrix is seen in FIG. 10. The matrix includes locations associated with each pixel, which include numbers from 0 to 255, or similar range. Thus, the matrix of FIG. 10 has elements of similarity to the bitmap of FIG. 8; however, the matrix allows greater fine-tuning of the assistance (i.e. increasing the likelihood of a "firing") given to a given color plane in a given pixel location.

Depending on the results of the comparison, the cyan and magenta error is modified by multiplication with a fraction derived from the matrix. In one embodiment, the fraction is the matrix value at the location of interest divided by 255. Alternatively, a constant, such as 0.5, can be used in place of the quantity matrix_value/256 in the above equations.

At block 906, the decision to fire a color plane is made by comparison of the modified errors. For example, the errors of the cyan and magenta for the pixel location are compared, and one plane is fired. The pseudo code below illustrates the situation for cyan (c) and magenta (m).

```
if(magenta_error_modified>cyan_error_modified)
    magenta_fired=1
    cyan_fired=0;
else
    cyan_fired=1;
    magenta_fired=0.
```

At block 908, control is returned to block 518 of FIG. 5.

FIG. 11 shows an exemplary method 1100 that corrects unaesthetic print output associated with unbalanced color plane values. The method 1100 shows detail not seen in block 518 of FIG. 5, by which error is modified and distributed in a manner that counters the tendency toward unbalanced error, i.e. error that is associated with color planes having unbalanced numerical values within a given region.

At block 1102, for the pixel of current interest, a number of values are obtained, including: color plane values for cyan prime and magenta prime, the error values for cyan and magenta, the error weights array (seen at 1210 in FIG. 12, comprising at least one error format as seen in FIG. 3) and true/false values for cyan_fire and magenta_fire (i.e. Boolean variables set to indicate if cyan or magenta has been fired for this pixel).

A sum of the errors (such as: sum_error=cyan_error+magenta_error) is calculated, and the sum of C' and M' is calculated.

The weights are calculated. Weights control the fraction of the error going to each of several adjacent pixels. For example, weights may be associated with cyan_forward, cyan_forward-and-down, cyan_down, and cyan_down-and-back, and similarly for magenta. Weights for the sum (C'+M') are also calculated. For example, the below pseudo code calculates four weights based on the sums associated with cyan and magenta.

sum_weight_forward=weights[sum][1]

sum_weight_forward_and_down=weights[sum][2]

sum_weight_down=weights[sum][3]

sum_weight_down_and_back=weights[sum][4]

At block 1104, if c_fired is true, then subtract 255 or the bit depth quantity is subtracted from cyan error.

At block 1106, if m_fired is true, then subtract 255 or the bit depth quantity is subtracted from magenta error.

At block 1108, a comparison of the magnitude color values of cyan prime (C') and magenta prime (M') is made. The error values, cyan_error and magenta_error, associated with the pixel location within the color plane, are not used in the comparison.

At block 1110, where cyan was less than magenta, cyan error is calculated and distributed as minority error. Referring to FIG. 3, it can be seen that each pixel distributes error, forward, forward-and-down, down, and back-and-down. Therefore, each pixel receives error from the pixels that are behind, above-and-back, above, and above-and-forward.

Because the value for cyan prime (C') was determined at block 1108 to be less than the value for magenta prime (M'), cyan prime is considered to be the minority color. In exemplary steps, variables are assigned to represent the minority weight for the locations (e.g. forward, forward-and-down, etc.) to which the error will be distributed. For example, the below pseudo code assigns four cyan weights to associated "minority" variables.

minority_weight_forward=weights[C'][1]

minority_weight_forward_and_down= weights[C'][2]

minority_weight_down=weights[C'][3]

minority_weight_down_and_back=weights[C'][4]

The cyan error is then calculated to be the product of the minority weight and the cyan error. For example, the below pseudo code assigns error to four locations on the cyan color plane with respect to the current pixel. The error assigned is proportional to the minority weight.

cyan_forward=minority_weight_forward*cyan_error cyan_forward_and_down=minority_weight_forward_and_down*cyan_error cyan_down=minority_weight_down*cyan_error cyan_down_and_back=minority_weight_down_and_back*cyan_error Having calculated the cyan error, it is distributed to the adjacent pixels. For example, cyan_error for the pixel forward of the pixel of interest is incremented by the value cyan_forward. The other error distributions are made similarly.

At block 1112, the magenta error (majority error) is calculated to be the weight of the sum times the sum of the error (as seen in block 1102) for both colors for the pixel of interest, minus the cyan error distribution. For example, the below pseudo code calculates the magenta error for distribution to four adjacent pixels.

```
magenta_forward=sum_weight_forward*sum_
    error-cyan_forward magenta_forward_and_down=sum_weight_
    forward_and_down*sum_error-cyan_
    forward_and_down magenta_down=sum_weight_down*sum_
    error-cyan_down magenta_down_and_back=sum_weight_
    down_and_back*sum_error-cyan_down_
    and_back
```

Having calculated the magenta error, it is distributed to the adjacent pixels. For example, the variable magenta_error for the pixel forward of the pixel of interest is incremented by the value magenta_forward. The other error distributions are made similarly.

At block 1114, the magenta error is calculated and distributed in the same manner as was the cyan error at block 1110.

At block 1116, the cyan error is calculated and distributed in the same manner as was the magenta error at block 1112.

At block 1118, the calculations for the current pixel are completed, and control returns to block 520 of FIG. 5.

FIG. 12 shows a block diagram illustrating an implementation of a file translation module 1200. The file translation module may be implemented as a software structure including statements executed by a processor, or may be implemented in hardware, such as by an application specific integrated circuit (ASIC). The file translation module 1200 translates an input file 1202 from a first format into an output file 1204 in a second format. The first file format typically includes information too detailed for use by a printer. The second file format includes specific information required for operation of the ink jet, color laser or other print engine. The translation procedure results in an output file having data that results in aesthetic print output.

An input file 1202 is typically an 8-bit CMYK (cyan, magenta, yellow, black) file or similar file format. Such a file has 8-bits of data within each color plane for each pixel. As a result, the file contains substantially more information than a simple fire or no-fire instruction associated with each pixel of each color plane, and more information than is needed to control each color ink jet or similar device. Accordingly, the input file must be processed to provide information usable by the printing device.

A halftoning module 1206 includes the functionality seen in FIGS. 4, 5, 6, 9 and 11. This module supports a halftoning method, which may be included within an appropriate apparatus, that reduces the occurrence of unaesthetic color print output associated with particular relationships found between the numeric data contained within the color data planes. The calculation, modification and distribution of error values, resulting from the mismatch between color plane values and firing thresholds, are performed in a manner that minimizes unaesthetic color print output.

An error weights array 1208 includes at least one weight format, such as weight format 300 seen in FIG. 3. Each weight format includes a quantity of pixels to which the error may be distributed. In the example of FIG. 3, four pixels are shown. The weight format may also include the relative locations of the four pixels, such as forward, forward-and-down, etc. The weight format additionally includes fractional amounts associated with each pixel. In one implementation, the factional amounts total 100%; alternatively, the error may be inflated or deflated by a value other than 100%. In the example of FIG. 3, the factional amounts are seven-, one-, five- and three-sixteenths.

The error weights array 1208 may include one weight format 300 for each possible value for the color associated with any pixel location on any color plane. Accordingly, slightly different percentages of the error would be distributed to different locations, based on the weight format selected. For example, if the value of a given pixel on a given color plane is 54, then the $54^{th}$ record within the error weights array could be used to distribute the error. By having a number of error formats, the error is not always distributed in the same manner, thereby tending to prevent repetitive patterns.

An error modification function array 1210 includes at least one of error modification function, such as that seen in FIG. 7.

A bitmap array 1212 may includes at least one bitmap, having characteristics similar to the partial bitmap seen in FIG. 8. Since the distribution of the ones and zeros influences the modification of the error, one bitmap may be more effective than another, depending on circumstances.

A matrix array 1214 includes at least one matrix, similar to that seen in FIG. 10. In a manner similar to the use of bitmaps, one matrix may work better than another in certain circumstances.

In conclusion, by calculating, modifying and distributing error in the manner shown, and by making firing decisions in the manner shown, the aesthetic problems associated with unbalanced, balanced or overlapping print data may be mitigated.

It should be noted that while in some environments, each the color plane is 8-bit in the input file and 1-bit in the output file, this is not required. As a result, the above methods could be adapted with minimal modification to different file formats. Similarly, while 255 has been represented in examples above as a threshold value resulting in the "firing" of a color plane, a different threshold value could be substituted. And further, while cyan and magenta have been used as exemplary colors, other ink colors could be substituted without difficulty. And still further, while FIGS. 3, 7, 8 and 10 are exemplary of error distribution, error modification, a bit map and a matrix, respectively, each figure could be modified by one trained in the art, while still in keeping within the context and spirit of the above disclosure.

The invention claimed is:

1. A method of producing aesthetic color print output, comprising:
   modifying a first error value to produce a first modified error value; and
   basing a color plane firing decision on a comparison of the first modified error value and a second error value.

2. The method of claim 1, wherein modifying comprises:
   using a function to derive an error modification value; and
   multiplying the error modification value with the first error value in response to a value in a bitmap.

3. The method of claim 2, wherein an input value to the function is a minority color plane value.

4. The method of claim 1, wherein modifying comprises multiplying the first error value and the second error value by a fraction derived from a matrix.

5. The method of claim 1, additionally comprising distributing fractional portions of the first error value and the second error value to locations on a first color plane and a second color plane, respectively.

6. The method of claim 5 wherein distributing comprises using a weight format to determine the fractional portions.

7. The method of claim 6 additionally comprising selecting the weight format based on a magnitude of a first color plane value.

8. A method of processing color plane information, comprising:
   modifying first and second error values to produce first and second modified error values, respectively;
   basing a color plane firing decision on a comparison of the first modified error value and the second modified error value; and
   distributing portions of the first and second error values to adjacent pixel locations on first and second color planes, respectively.

9. The method of claim 8, wherein modifying comprises:
   using a function to derive an error modification value; and
   multiplying the error modification value with the first error value in response to a value in a bitmap.

10. The method of claim 9, wherein an input value to the function is a minority color plane value.

11. The method of claim 8, wherein modifying comprises multiplying the first error value and the second error value by a number derived from a matrix.

12. The method of claim 8, wherein modifying comprises multiplying the first error value and the second error value by a number derived from a matrix if the first and second color plane values are greater than the matrix value and greater than the inverse matrix value, respectively.

13. The method of claim 8 wherein distributing comprises using a weight format to determine the portions.

14. The method of claim 13 additionally comprising selecting the weight format based on a magnitude of a first color plane value.

15. A system for producing color print output, comprising:
   a file translation module configured to:
      modify first and second error values to produce first and second modified error values, respectively;
      base a color plane firing decision on a comparison of the first and second modified error values; and
      distribute the first and second error values to adjacent pixel locations on a first and a second color plane, respectively, according to an error format.

16. The system of claim 15, wherein the file translation module comprises:
   an error modification function to provide a number by which error is multiplied to yield modified error.

17. The system of claim 15, wherein the file translation module comprises: a bitmap to which reference may be made to determine to which color plane the error modification function is applied.

18. The system of claim 15, wherein the file translation module comprises: a matrix to provide numbers by which error is multiplied to yield modified error.

19. A processor readable medium having processor executable instructions thereon which, when executed by a processor cause the processor to:
   modify first and second error values to produce first and second modified error values, respectively;
   base a color plane firing decision on a comparison of the first and second modified error values; and
   distribute the first and second error values to adjacent pixel locations on a first and a second color plane, respectively.

20. The processor readable medium of claim 19, wherein the instructions also cause the processor to:
   use a function to derive an error modification value; and
   multiply the error modification value with the first error value in response to a positive value in a bitmap.

21. The processor readable medium of claim 20, wherein the instructions also cause the processor to use a minority color plane value as an input value to the function.

22. The processor readable medium of claim 19, wherein the instructions also cause the processor to:
   select, based on the value of a first and a second color value, first and second weight formats, respectively, to distribute the first and second error values, respectively, to adjacent pixel locations on the first and second color planes, respectively.

23. The processor readable medium of claim 22, wherein the instructions also cause the processor to select the first and second weight formats based on a magnitude of the first and second modified error values, respectively.

24. The processor readable medium of claim 19, wherein the instructions also cause the processor to use a matrix to modify the first error value and the second error value.

25. The processor readable medium of claim 19, wherein the instructions also cause the processor to multiply the first and second error values by a number derived from a matrix if a first color plane value and a second color plane value are greater than the matrix value and greater than the inverse matrix value, respectively.

* * * * *